United States Patent
Liu

(10) Patent No.: US 6,634,467 B2
(45) Date of Patent: Oct. 21, 2003

(54) CABLE BRAKE FOR A BICYCLE

(76) Inventor: Chieh-I Liu, No. 32, Lane 200, Shang-Kung Rd., Tanshui Chen, Taipei Hsien (TW)

( * ) Notice: Subject to any disclaimer, the term of this patent is extended or adjusted under 35 U.S.C. 154(b) by 0 days.

(21) Appl. No.: 10/151,861

(22) Filed: May 22, 2002

(65) Prior Publication Data

US 2002/0175028 A1 Nov. 28, 2002

(30) Foreign Application Priority Data

May 25, 2001 (TW) ........................................ 90208612 U

(51) Int. Cl.[7] ................................................. B62L 1/06
(52) U.S. Cl. .................................... 188/24.16; 188/2 D
(58) Field of Search ............................. 188/2 D, 24.14, 188/24.15, 24.16, 24.21, 24.22; 74/500.5, 501.5 R

(56) References Cited

U.S. PATENT DOCUMENTS

| | | | | | |
|---|---|---|---|---|---|
| 5,829,314 | A | * | 11/1998 | Scura | ........................ 74/502.4 |
| 5,927,442 | A | * | 7/1999 | Liao | ........................ 188/24.16 |
| 6,098,486 | A | * | 8/2000 | Liao | ........................ 74/500.5 |
| 6,311,805 | B1 | * | 11/2001 | Juan | ........................ 188/24.16 |
| 6,523,649 | B1 | * | 2/2003 | Juan | ........................ 188/24.16 |

* cited by examiner

*Primary Examiner*—Christopher P. Schwartz
(74) *Attorney, Agent, or Firm*—Venable LLP; Fei-Fei Chao

(57) ABSTRACT

A cable brake for a bicycle has a frame and a seat. The frame has a spire formed at a top thereof. A hole is defined beneath the spire for two first cables extending therethrough. The seat is received in a chamber defined in the frame, and has a channel defined therein and a first fastener and two second fasteners provided therein. The first cables are extended in the seat and secured by the first fastener, and connected with two brake levers. Two second cables are extended in the seat through a bottom surface of the frame and secured by the second fasteners respectively. The second cables are connected with two braking means respectively. The seat is suspended in the frame by the first and second cables.

12 Claims, 8 Drawing Sheets

CABLE BRAKE FOR A BICYCLE

BACKGROUND OF THE INVENTION

1. Field of the Invention

The present invention is related to a cable brake for a bicycle, and more particularly to a cable brake that has two first cables of which anyone can control two second cables to synchronously operate braking means, so that even if one first cable or second cable is broken, the other cables can be used for effectively operating the braking means.

2. Description of Related Art

Cycles, such as bicycles, generally have two wheels and two brakes respectively mounted on the two wheels to slow down the cycles. However, conventional brakes for the bicycles have some shortcomings as following:

1. It is dangerous to brake the bicycle traveling at a high speed or because a distance required to come to a halt is too long;
2. The front and rear brakes are asynchronously operated, and this can lead to instability of the bicycle. For example, too early application of the front brake only leads to the rear wheel dangerously lifting off the ground, and vice-versa, if the rear brake only is applied too soon the rear wheel will skid in a dangerous way.

Nowadays, there are synchronous brakes for bicycles invented. However, when anyone of the brake cables is broken, the synchronous brakes will fail.

Therefore, the invention provides an improved cable brake for a bicycle to mitigate and/or obviate the aforementioned problems.

SUMMARY OF THE INVENTION

The main objective of the invention is to provide a cable brake for a bicycle that can be used if anyone of cables is broken.

Other objects, advantages and novel features of the invention will become more apparent from the following detailed description when taken in conjunction with the accompanying drawings.

DETAILED DESCRIPTION OF THE PREFERRED EMBODIMENT

Figure 1:
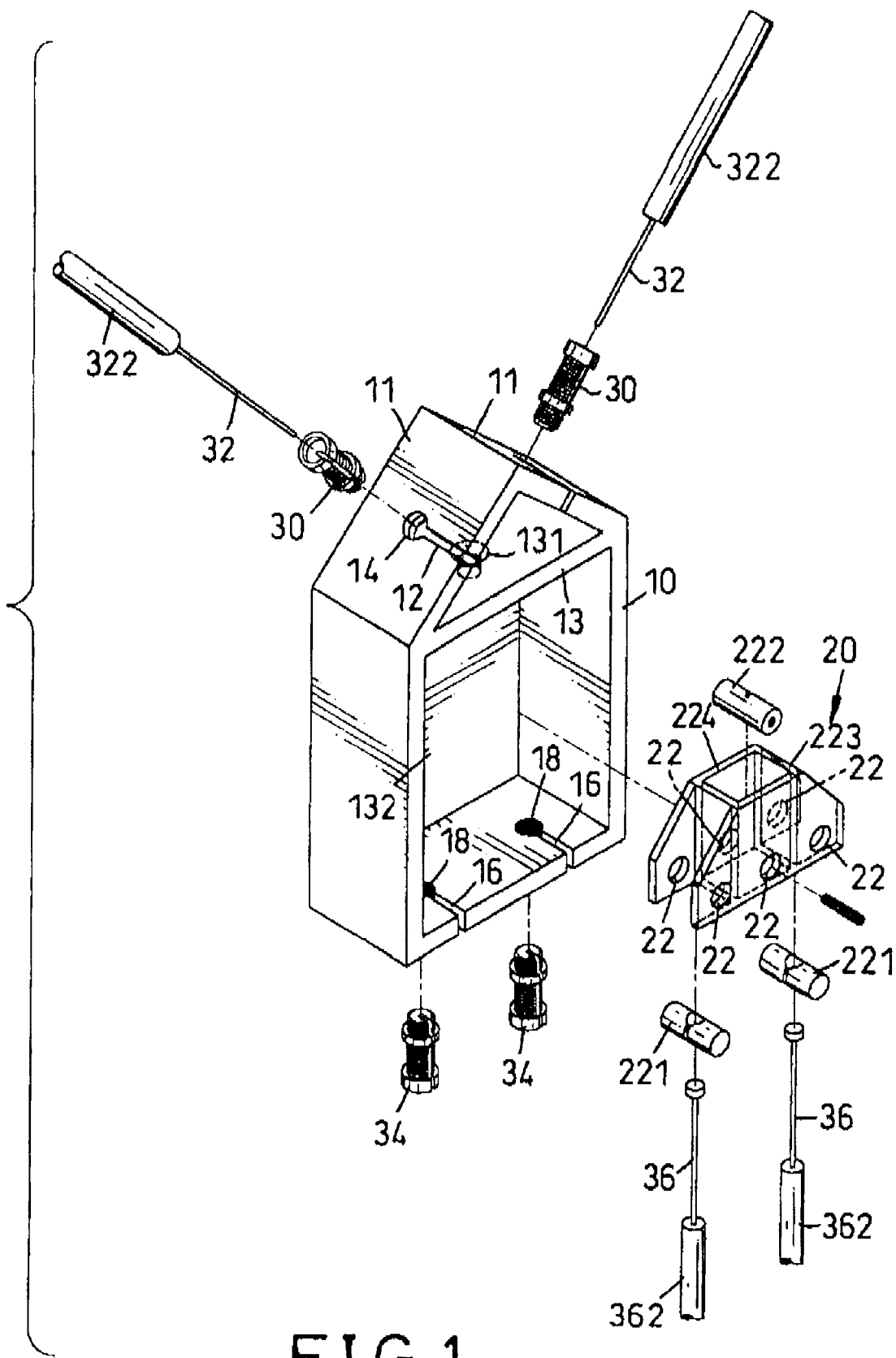
FIG. 1 is an exploded perspective view of a first embodiment of a cable brake in accordance with the invention.

Referring to FIG. 1, a cable brake in accordance with the invention includes a frame (10) installed at a proper position of a bicycle. The frame (10) has a spire (not numbered) formed by two inclined planes (11). Two first notches (12) and two first apertures (14) are respectively defined through the inclined planes (11), and two second notches (16) and two second apertures (18) are defined through a bottom surface of the frame (10) and in alignment with the first notches (12) and apertures (14) respectively. A separator (13) is formed beneath the spire and has a stepped hole (131), of which an upper diameter is larger than a lower diameter, defined therethrough. A chamber (132) is defined beneath the separator (13) for receiving a seat (20).

Figure 6:
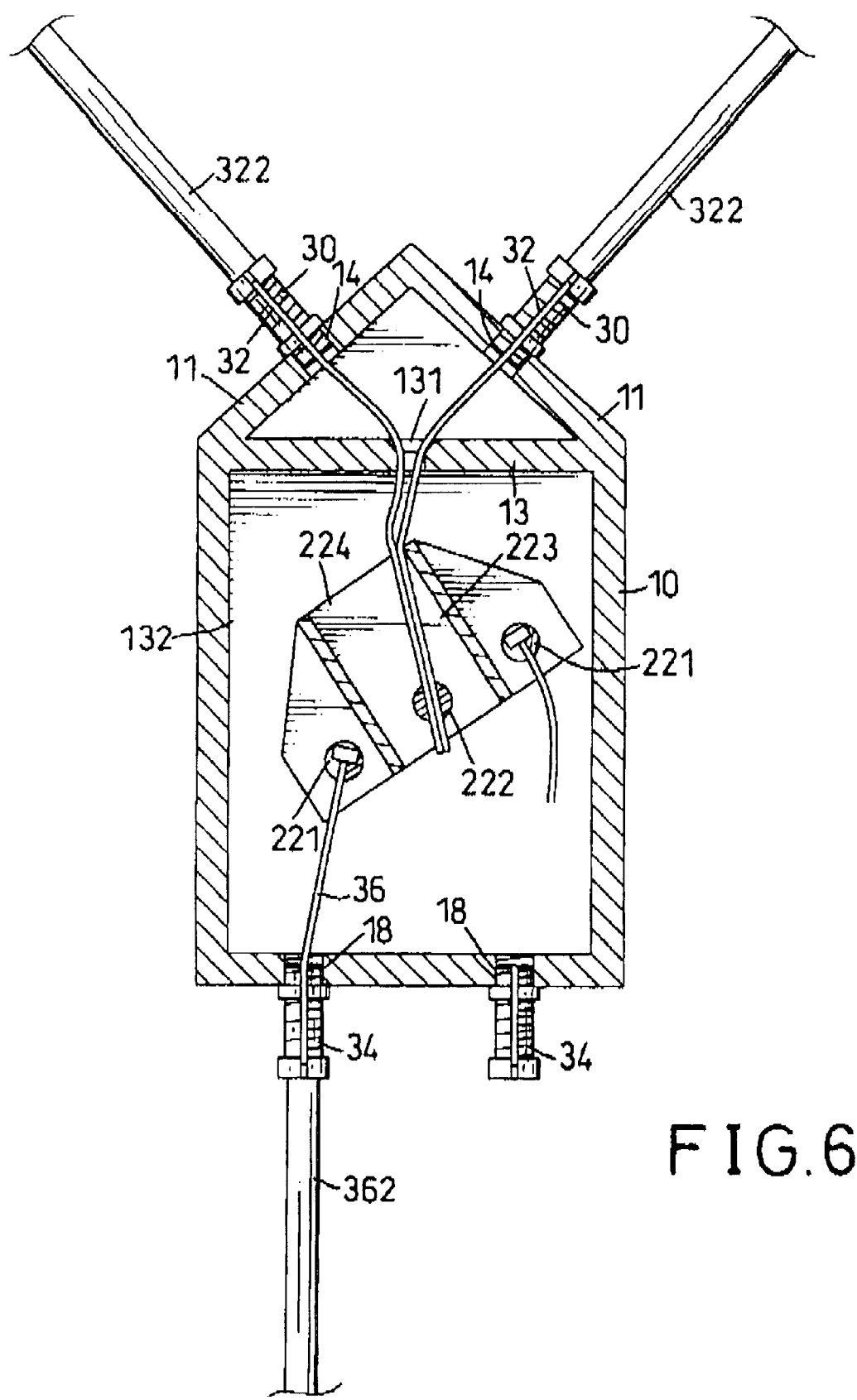
FIG. 6 is a front sectional view showing that the cable brake is operated when a second cable is broken.

The seat (20) has a plurality of orifices (22) in pairs defined therethrough. A first cable fastener (222) and two second cable fasteners (221) are respectively mounted in the openings (22). Two first cables (32) are secured in the first cable fastener (222), and two second cables (36) are respectively secured in the second cable fasteners (221). A channel (223) is vertically defined through the seat (20) to locate the first cable fastener (222) therein. An opening (224) is defined at a top of the channel (223). The channel (223) has a proper ratio of a height of the channel (223) to a width of the opening (224) to make the first cable (32) not incline over 30° from an original angle when one of the second cables (36) is broken, as shown in FIG. 6.

Two first tubes (30) are respectively mounted in the first apertures (14). The first cables (32) are in turn extended through the first tubes (30) respectively, the hole (131), and secured in the first cable fastener (222). Two first cable sleeves (322) sheath the first cables (32) respectively.

Two second tubes (34) are respectively mounted in the second apertures (18). The second cables (36) are extended through the second tubes (34) and secured in the second cable fasteners (221) respectively. Two second cable sleeves (362) are respectively provided outside the second cables (36) and abut the second tubes (34).

Figure 2:
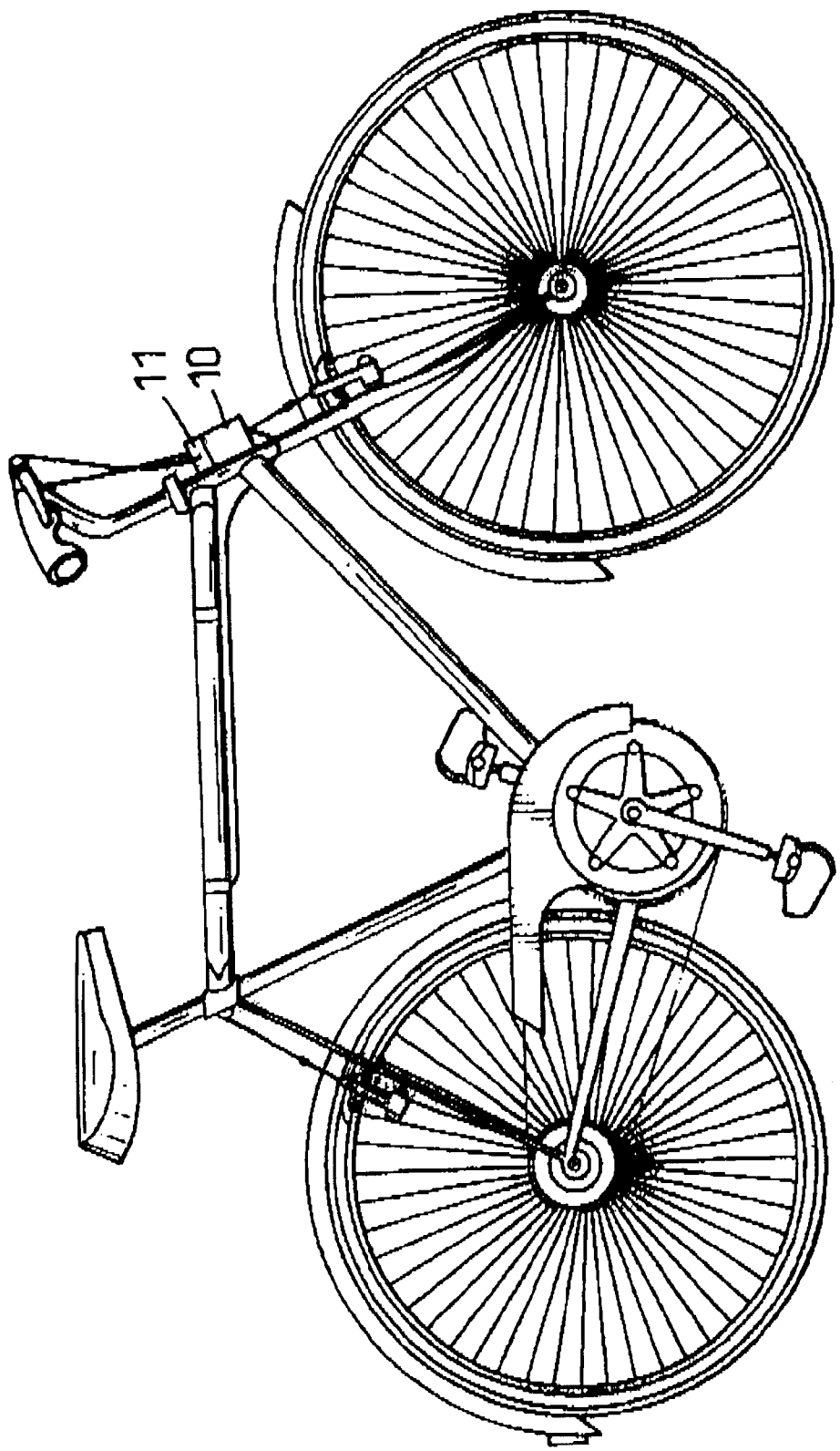
FIG. 2 is a schematic view of a bicycle with the cable brake in accordance with the invention.
Figure 3:
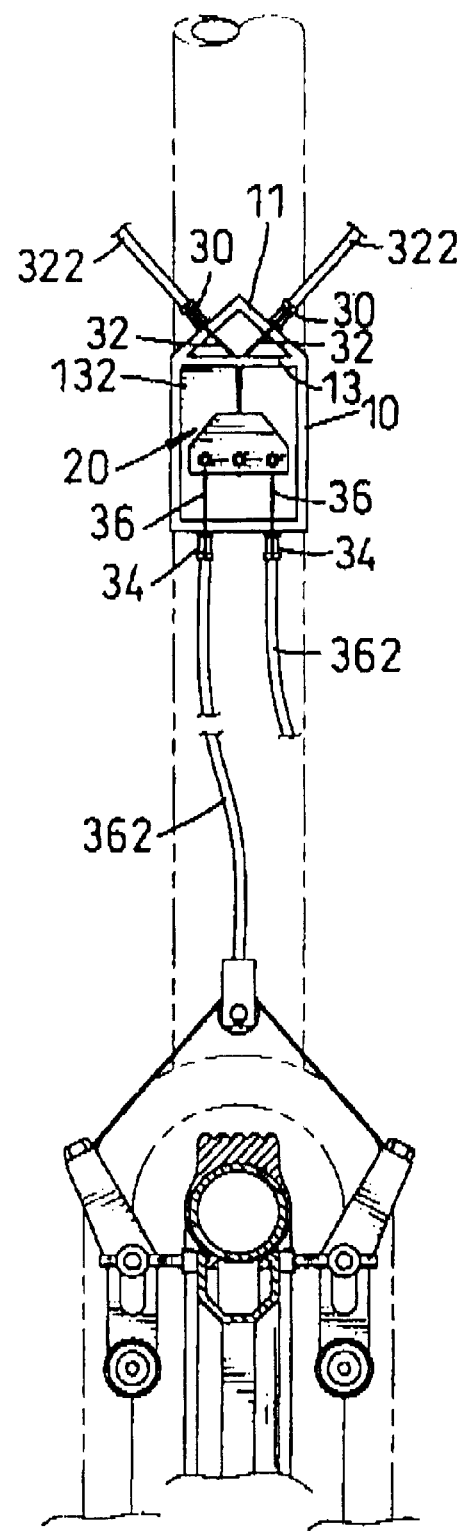
FIG. 3 is a schematic view of the cable brake connected with braking means.
Figure 4:
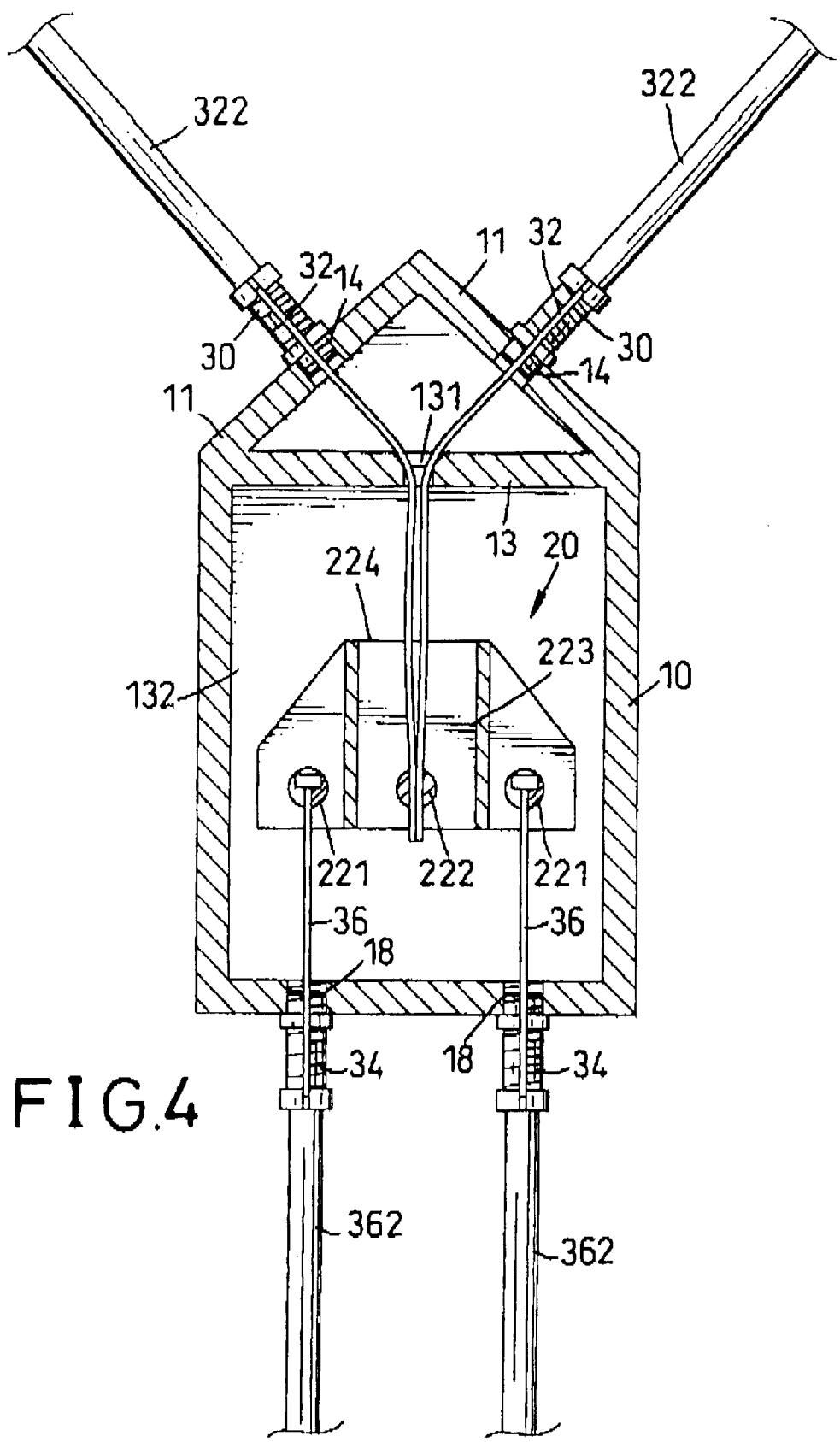
FIG. 4 is a front sectional view of the cable brake.
Figure 5:
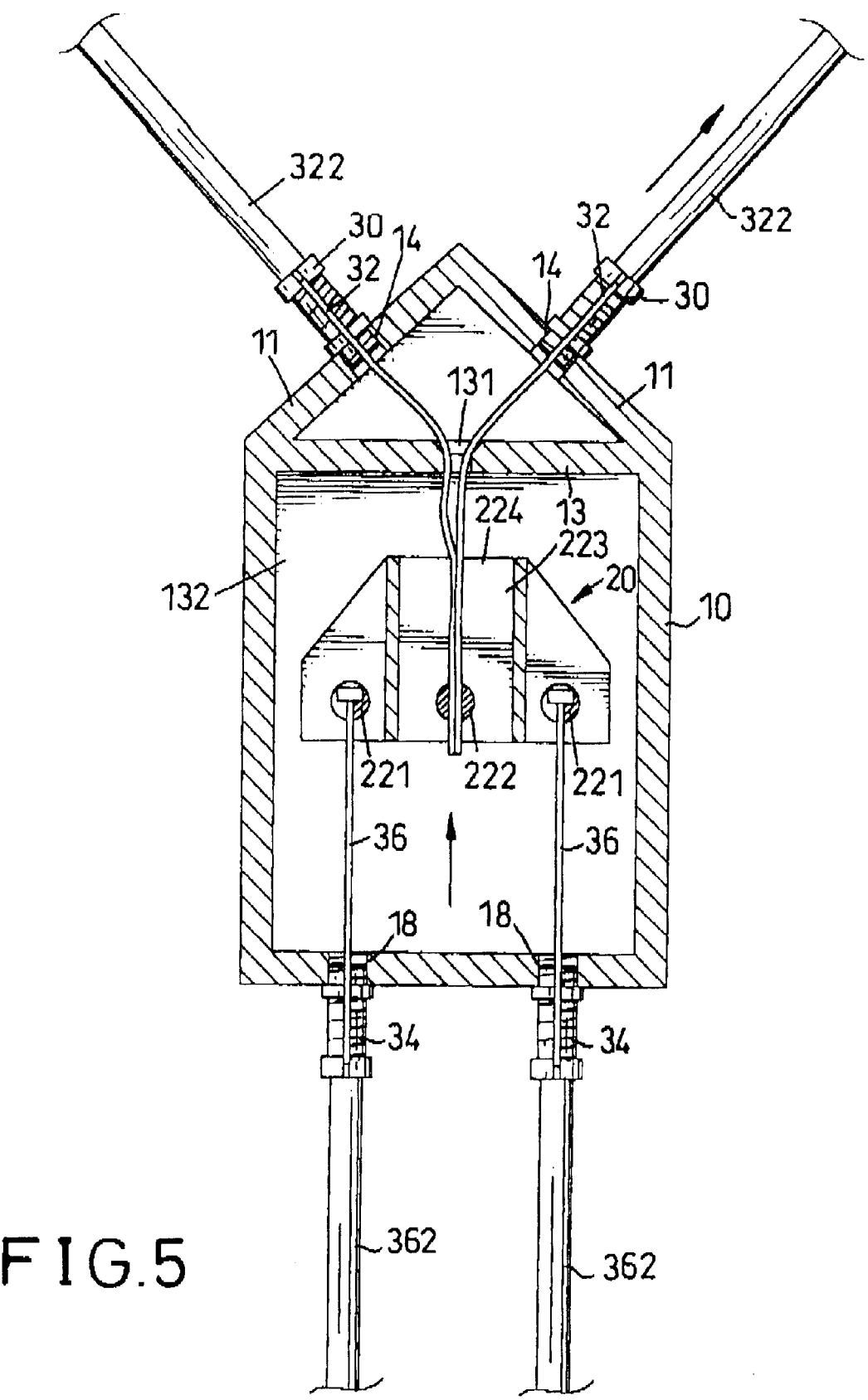
FIG. 5 is a front sectional view showing that the cable brake is operated.

Referring to FIGS. 2 and 3, the frame (10) is installed on a bicycle. The first cables (32) are respectively connected with brake levers on a handle-bar. The second cables (36) are connected with front braking means and rear braking means. Referring to FIGS. 4 and 5, when a user operates either of the brake levers to pull the corresponding first cables (32), the seat (20) is moved upwards and the second cables (36) are pulled upwards to synchronously operate the front and rear braking means.

Referring to FIG. 6, if one of the first cables (32) is broken, the seat (10) is still pulled by the other first cable (32) to operate the braking means. If one of the second cables (36) is broken, the seat (10) is not inclined over 30°, so that pulling the first cables (32) can effectively pull the other second cable (36) to operated the braking means. Thus, it is safe for a user in a situation that one of the cables (32, 36) is broken as the braking means is still effective.

Figure 7:
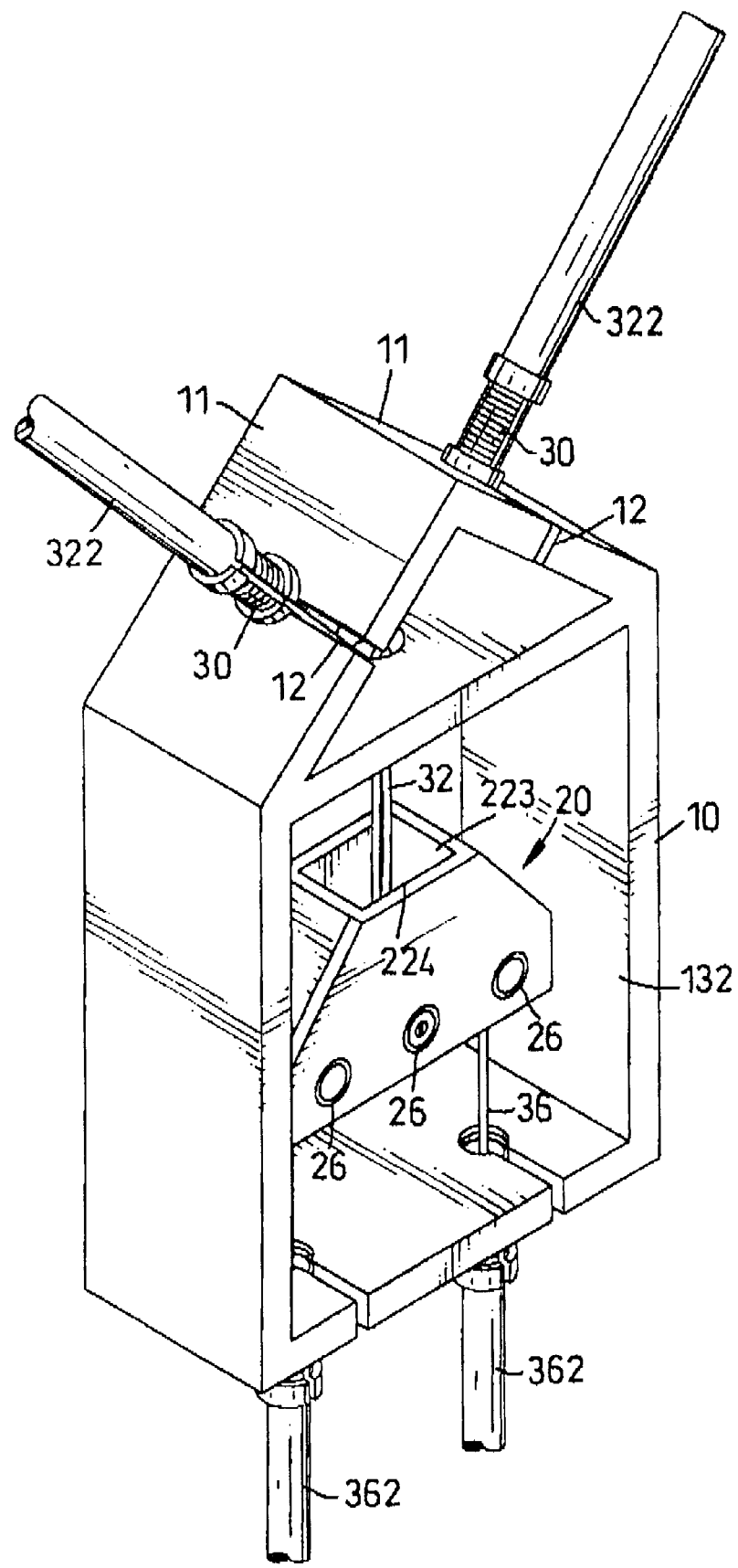
FIG. 7 is a perspective view of a second embodiment of the cable brake in accordance with the invention.
Figure 8:
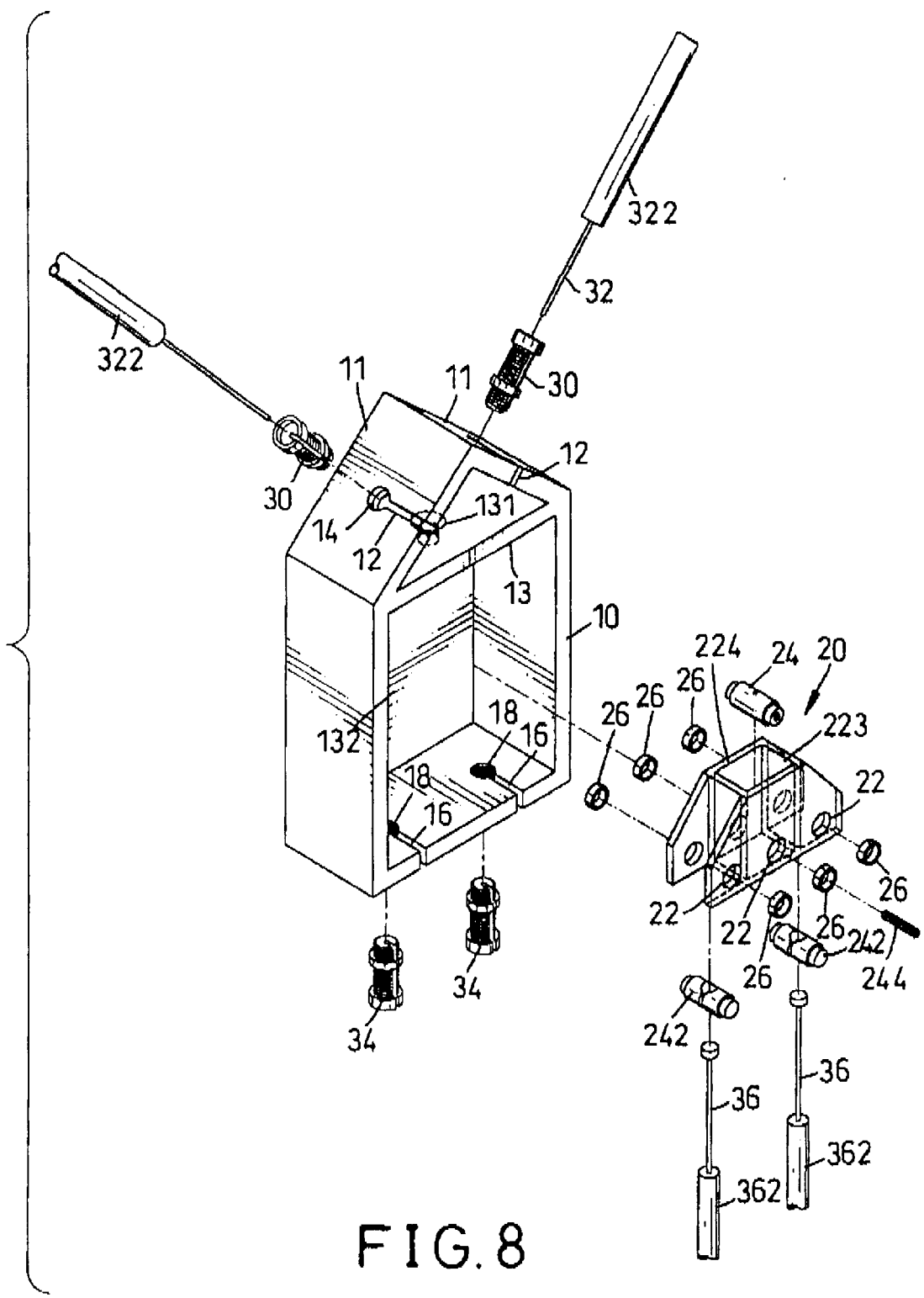
FIG. 8 is an exploded perspective of the cable brake in FIG. 7.

Referring to FIGS. 7 and 8, in another embodiment of the invention, the first cable fastener (222) and the second cable fasteners (221) are replaced with a first pin (24) and two second pins (242). The pins (24, 242) each have two steps (not numbered) respectively formed at two ends thereof and a plurality of rings (26) (or bearings) is provided at the respective steps and received in the respective orifices (22). Therefore, the pins (24, 242) can be turned in the openings (22).

The first cables (32) are extended through the first tubes (30) and secured in the first pin (24) by a screw (244) inserted through the pin (24). The first cables (32) can be entered into the respective apertures (14) via the notches (12). The first sleeves (322) respectively sheath the first cables (32) and abut the first tubes (30).

According to the present invention, the frame (10) is mounted on the bicycle. The first and second cables (32, 36) are extended in the frame (10) and secured on a seat (20) in the frame (10), wherein the first cables (32) are connected with the brake levers, and the second cables (36) are connected with braking means. The user can operate the brake levers to pull the first cables (32), the seat (20) and the second cables (36), so that the; front and rear braking means are operated synchronously. In a situation that one of the first and second cables (32, 36) is broken, the user still can operate the brake by the other cables (32, 26).

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A cable brake for a bicycle comprising:

a frame (10) mounted on the bicycle, the frame (10) having a spire formed at a top thereof, a hole (131) defined beneath the spire, a chamber (132) defined between the hole (131) and a bottom surface thereof;

a seat (20) received in the chamber (132), the seat (20) having a plurality of orifices (22) in pairs defined therethrough, a channel (223) vertically defined in a center of the seat (20), a first fastener (222) and two second fasteners (221) respectively received in the orifices (22);

two first cables (32) extending through the spire and the hole (131) and secured in the first fastener (222); and two second cables (36) extending through the bottom surface of the frame (10) and secured in the second fastener (221) respectively.

2. The cable brake as claimed in claim 1, wherein the channel (223) has an opening (224) with a ratio of a width of the opening (224) to a height of the channel (223) to make the first cables (32) not incline over 30° from an original angle when one of the second cables (36) is broken.

3. The cable brake as claimed in claim 1, wherein the spire is composed of two inclined surfaces (11) formed at the top of the frame (10), two first notches (12) and two first apertures (14) respectively defined through the inclined surfaces (11).

4. The cable brake as claimed in claim 1, wherein the hole (131) defined through a separator (13) formed beneath the inclined surfaces (11).

5. The cable brake as claimed in claim 4, the hole (131) has an upper diameter larger than a lower diameter.

6. A cable brake for a bicycle comprising:

a frame (10) mounted on the bicycle, the frame (10) having a spire formed at a top thereof, a hole (131) defined beneath the spire, a chamber (132) defined between the hole (131) and a bottom surface thereof;

a seat (20) received in the chamber (132), the seat (20) having a plurality of orifices (22) in pairs defined therethrough, a channel (223) vertically defined in a center of the seat (20), a first pin (24) and two second pin (242) respectively received in the orifices (22);

two first cables (32) extending through the spire and the hole (131) and secured in the first pin (24); and two second cables (36) extending through the bottom surface of the frame (10) and secured in the second pin (242) respectively.

7. The cable brake as claimed in claim 6, wherein a plurality of rings (26) is respectively provided at ends of the first pin (24) and second pins (242) and received in the respective orifices (22).

8. The cable brake as claimed in claim 6, wherein a plurality of bearings is respectively provided at ends of the first pin (24) and second pins (242) and received in the respective orifices (22).

9. The cable brake as claimed in claim 6, wherein the pins (24, 242) each have two steps respectively formed at two ends thereof.

10. The cable brake as claimed in claim 6, wherein the frame (10) has two first apertures (14) defined through the spire, two second apertures (18) defined through a bottom surface thereof, two first tubes (30) respectively inserted in the first apertures (14), and two first sleeves (322) sheathing the first cables (32) and abutting the first tubes (30) respectively.

11. The cable brake as claimed in claim 10, wherein the frame (10) has two second tubes (34) respectively inserted in the second apertures (18), and two second sleeves (362) sheathing the second cables (36) and abutting the second tubes (34) respectively.

12. The cable brake as claimed in claim 10, wherein the frame (10) has two first notches (12) defined through the spire and in communication with the first apertures (14), and two second notches (16) defined through the bottom surface thereof and in communication with the second apertures (18).

* * * * *